US008478717B2

(12) United States Patent  (10) Patent No.: US 8,478,717 B2
Vedula et al.  (45) Date of Patent: Jul. 2, 2013

(54) ENTERPRISE COLLABORATION WITH REUSABLE CONTENT

(75) Inventors: Ravikiran Vedula, Belmont, CA (US); Eric S. Chan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 12/843,157

(22) Filed: Jul. 26, 2010

(65) Prior Publication Data
US 2012/0023129 A1    Jan. 26, 2012

(51) Int. Cl.
*G06F 17/00* (2006.01)

(52) U.S. Cl.
USPC ......................................................... 707/608

(58) Field of Classification Search
USPC .................................. 707/769, 608, 999.201
See application file for complete search history.

(56) References Cited

U.S. PATENT DOCUMENTS

| | | | |
|---|---|---|---|
| 7,496,841 B2 * | 2/2009 | Hadfield et al. | 715/255 |
| 8,027,854 B2 * | 9/2011 | Baggett et al. | 705/5 |
| 2005/0140773 A1 * | 6/2005 | O'Hara et al. | 347/237 |
| 2007/0124374 A1 * | 5/2007 | Arun et al. | 709/204 |
| 2007/0156687 A1 * | 7/2007 | Idicula et al. | 707/8 |
| 2009/0013043 A1 * | 1/2009 | Tan | 709/205 |
| 2009/0132220 A1 * | 5/2009 | Chakraborty et al. | 703/13 |
| 2009/0292773 A1 * | 11/2009 | Leedberg et al. | 709/205 |
| 2011/0010334 A1 * | 1/2011 | Vasudevan et al. | 707/608 |

* cited by examiner

*Primary Examiner* — Mohammed R Uddin
(74) *Attorney, Agent, or Firm* — Kilpatrick Townsend & Stockton LLP (57) ABSTRACT

Embodiments of the invention provide systems and methods for a collaboration environment in which a number of different workspaces can use the same, reusable content. According to one embodiment, a method of providing collaboration using reusable content can comprise identifying a content item to be included in a first workspace of a plurality of workspaces of a collaboration environment. A first proxy representing the identified content item can be created. The first proxy can have a unique identifier within the first workspace. A mapping table record can be created for the first proxy that links the first proxy to the content item. Additionally, a cross-reference table record can be created for the first proxy. The cross-reference record can identify a relationship of the first proxy to another content item in the first workspace.

11 Claims, 6 Drawing Sheets

ENTERPRISE COLLABORATION WITH REUSABLE CONTENT

BACKGROUND OF THE INVENTION

Embodiments of the present invention relate generally to methods and systems for a collaboration environment and more particularly to providing a collaboration environment in which a number of different workspaces can use the same, reusable content.

The concept of a workspace or a team workspace provides a way for users to share and collaborate on data for specific purposes. Some examples of such workspaces are forums, white boards in the Internet domain and workspaces in several enterprise applications. One significant limitation with these existing solutions is that the workspaces operate on content physically present within the application. For example, workspace users can collect information from several sources, but such content has to be "copied" into the workspace before it can be shared with or used by members of the workspace. This results in a proliferation of content in the enterprise and requires that some workspace user periodically updates or refreshes the content.

Other collaboration applications provide an aggregated view of content via portals or portlets into the existing content information. However, even in this case, the workspace has as many portlets/channels as the number of disparate systems being used. More importantly, it is not possible for such portal based workspace users to treat content from different sources in a uniform manner. Also, such solutions cannot be used to associate content already present in the workspace with content available from another repository. One of the requirements/features of such solutions is that when the collaboration application provides full access to the external content, changes made by end users in one workspace are visible to all users accessing the content from another applications/channels as well. That is, the changes affect the external content and are not confined to the workspace in which they are made. The portal workspace solutions typically include metadata facilities to support these user requirements, but the portal metadata facility is confined to the portal views. Hence, there is a need for improved methods and systems for providing a collaboration environment using reusable content and for providing more unified metadata facilities for many interoperable collaboration environments, workspaces, and business applications for sharing, aggregating, and relating the reusable contents from multiple data sources.

BRIEF SUMMARY OF THE INVENTION

Embodiments of the invention provide systems and methods for a collaboration environment in which a number of different workspaces can use the same, reusable content. According to one embodiment, a method of providing collaboration using reusable content can comprise identifying a content item to be included in a first workspace of a plurality of workspaces of a collaboration environment. A first proxy representing the identified content item can be created. The first proxy can have a unique identifier within the first workspace. A mapping table record can be created for the first proxy that links the first proxy to the content item. Additionally, a cross-reference table record can be created for the first proxy. The cross-reference record can identify a relationship of the first proxy to another content item in the first workspace. A second proxy representing the identified content item can also be created in a second workspace of the plurality of workspaces. The second proxy can have a unique identifier within the second workspace. A mapping table record can be created for the second proxy that links the second proxy to the content item.

For example, the record of the mapping table can comprise a local identifier field storing the unique identifier for the first proxy. A location identifier field of the mapping table record can store an identifier for locating the content item. The record of the mapping table can also include a workspace identifier field storing a unique identifier for the first workspace in the plurality of workspaces. A connect information field of the mapping table record can store information for accessing the content item. The record of the cross reference table can comprise a referrer field storing the local identifier for the first proxy. A referee field of the cross reference table can store a local identifier for a proxy of a content item to which the first proxy relates. One or more tags including metadata describing the content item to which the first proxy relates can also be stored in a field of the cross reference table.

When a user accesses the workspace, a selection of a content item to be accessed in the first workspace can be received. The mapping table can be searched for a record of a proxy for the selected content item. A determination can be made based on searching the mapping table as to whether the selected content item is a new content item in the first workspace. In response to determining the selected content item is a new content item in the first workspace, a proxy can be created representing the new content item and a mapping table record can be created for the proxy. In response to determining the selected content item is not a new content item, the selected content item can be accessed through a proxy for the selected content item. Based on the user's access of the content item, i.e., operations performed, a determination can be made as to whether to update the selected content item in the first workspace. In response to determining to update the selected content item in the first workspace, a record in the cross reference table for the proxy of the selected content item can be updated.

According to another embodiment, a system can comprise a processor and a memory communicatively coupled with and readable by the processor. The memory can have stored therein a series of instructions which, when executed by the processor, cause the processor to execute a collaboration environment providing collaboration using reusable content by identifying a content item to be included in a first workspace of a plurality of workspaces of a collaboration environment. The content item may be a remote content item, i.e., outside of the system executing the collaboration environment. A first proxy representing the identified content item can be created. The first proxy can have a unique identifier within the first workspace. A mapping table record can be created for the first proxy that links the first proxy to the content item. Additionally, a cross-reference table record can be created for the first proxy. The cross-reference record can identify a relationship of the first proxy to another content item in the first workspace.

For example, the record of the mapping table can comprise a local identifier field storing the unique identifier for the first proxy. A location identifier field of the mapping table record can store an identifier for locating the content item. The record of the mapping table can also include a workspace identifier field storing a unique identifier for the first workspace in the plurality of workspaces. A connect information field of the mapping table record can store information for accessing the content item. The record of the cross reference table can comprise a referrer field storing the local identifier for the first proxy. A referee field of the cross reference table can store a local identifier for a proxy of a content item to which the first proxy relates. One or more tags including metadata describing the content item to which the first proxy relates can also be stored in a field of the cross reference table.

When a user accesses the workspace, a selection of a content item to be accessed in the first workspace can be received. The mapping table can be searched for a record of a proxy for the selected content item. A determination can be made based on searching the mapping table as to whether the selected content item is a new content item in the first workspace. In response to determining the selected content item is a new content item in the first workspace, a proxy can be created representing the new content item and a mapping table record can be created for the proxy. In response to determining the selected content item is not a new content item, the selected content item can be accessed through a proxy for the selected content item. Based on the user's access of the content item, i.e., operations performed, a determination can be made as to whether to update the selected content item in the first workspace. In response to determining to update the selected content item in the first workspace, a record in the cross reference table for the proxy of the selected content item can be updated.

According to yet another embodiment, a machine-readable medium can have stored thereon a series of instructions which, when executed by a processor, cause the processor to provide collaboration using reusable content by identifying a content item to be included in a first workspace of a plurality of workspaces of a collaboration environment. A first proxy representing the identified content item can be created. The first proxy can have a unique identifier within the first workspace. A mapping table record can be created for the first proxy that links the first proxy to the content item. Additionally, a cross-reference table record can be created for the first proxy. The cross-reference record can identify a relationship of the first proxy to another content item in the first workspace. A second proxy representing the identified content item can also be created in a second workspace of the plurality of workspaces. The second proxy can have a unique identifier within the second workspace. A mapping table record can be created for the second proxy that links the second proxy to the content item.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing a workspace centric, homogenous, team personalized access to content with support for extensible functionality. That is, embodiments of the present invention provide a collaboration environment with many different types of collaboration artifacts or content items such as emails, documents, calendar events, task assignments, etc. in which users can access and manipulate the content items, for example, by applying tags to classify the content items, e.g., define categories for the content items, and/or define relationships between the content items. One example of a collaboration environment in which embodiments of the present invention may be implemented is Oracle Beehive Collaboration Server. Other similar environment may also be suitable for implementing embodiments of the present invention.

Generally speaking, embodiments of the present invention provide for assigning a unique identifier to a content item in a context, i.e., a current workspace, from which the content item is accessed. Based on the context/workspace from which the content item is accessed, a proxy of that content item can be provided. The proxy of a content item for a given context/workspace can be independent of other contexts/workspaces that access the same content item. Therefore, changes to a proxy within a workspace, e.g., tags applied to the proxy or definition of or changes to relationships between proxies of content items, do not effect the original content item or proxies of that content item in other workspaces. Furthermore and as will become apparent, the proxies provide a context/workspace specific view of a given content item without requiring that content item to be replicated within the workspace.

Stated another way, embodiments of the present invention provide a collaboration environment in which a number of different workspaces can use the same, reusable content. According to one embodiment, a method of providing collaboration using reusable content can comprise identifying a content item to be included in a first workspace of a plurality of workspaces of a collaboration environment. A first proxy representing the identified content item can be created. The first proxy can have a unique identifier within the first workspace. A mapping table record can be created for the first proxy that links the first proxy to the content item. Additionally, a cross-reference table record can be created for the first proxy. The cross-reference record can identify a relationship of the first proxy to another content item in the first workspace. A second proxy representing the identified content item can also be created in a second workspace of the plurality of workspaces. The second proxy can have a unique identifier within the second workspace. A mapping table record can be created for the second proxy that links the second proxy to the content item.

When a user accesses the workspace, a selection of a content item to be accessed in the first workspace can be received. The mapping table can be searched for a record of a proxy for the selected content item. A determination can be made based on searching the mapping table as to whether the selected content item is a new content item in the first workspace. In response to determining the selected content item is a new content item in the first workspace, a proxy can be created representing the new content item and a mapping table record can be created for the proxy. In response to determining the selected content item is not a new content item, the selected content item can be accessed through a proxy for the selected content item. Based on the user's access of the content item, i.e., operations performed, a determination can be made as to whether to update the selected content item in the first workspace. In response to determining to update the selected content item in the first workspace, a record in the cross reference table for the proxy of the selected content item can be updated. Various additional details of embodiments of the present invention will be described below with reference to the figures.

Figure 1:
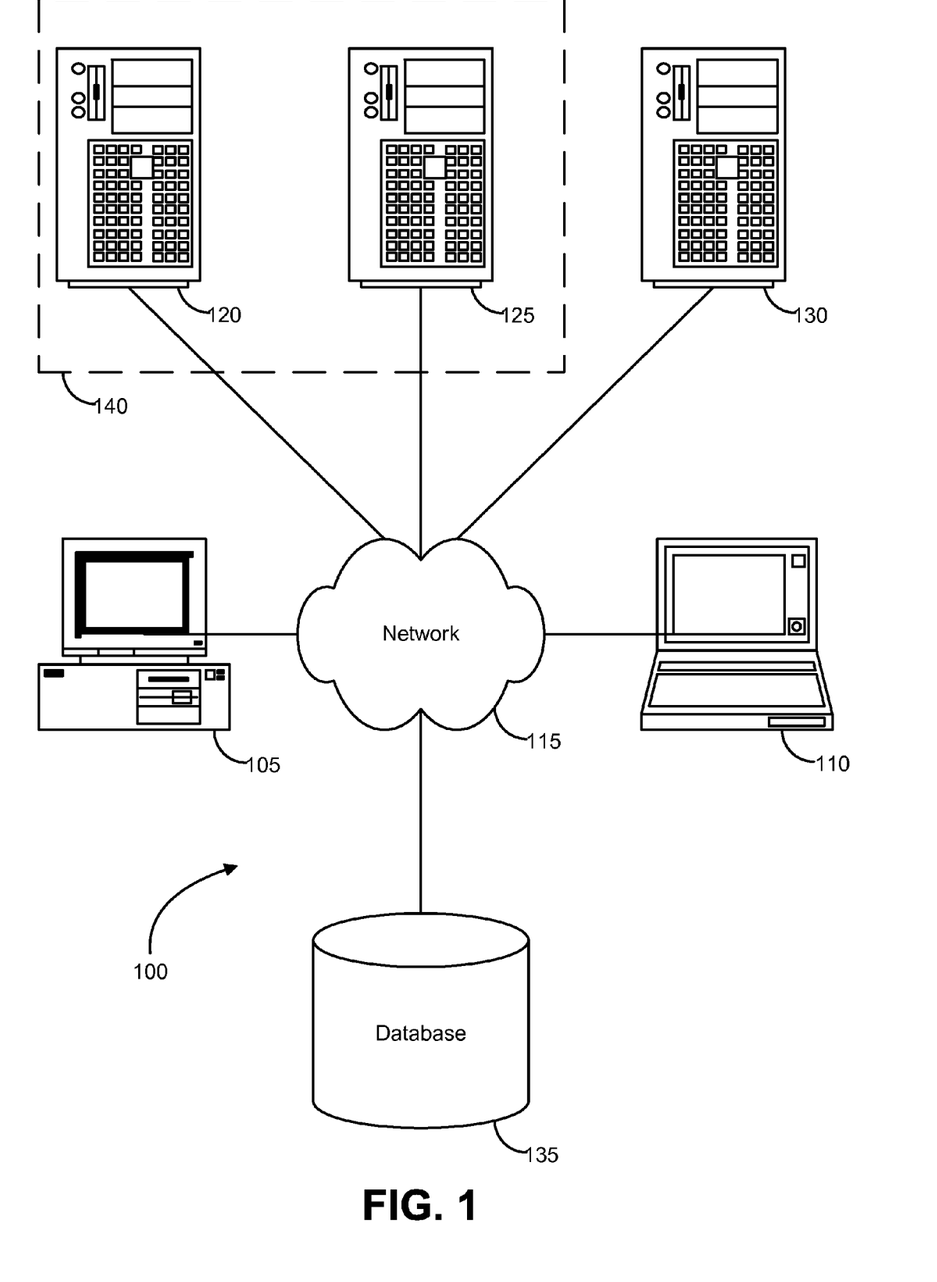
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
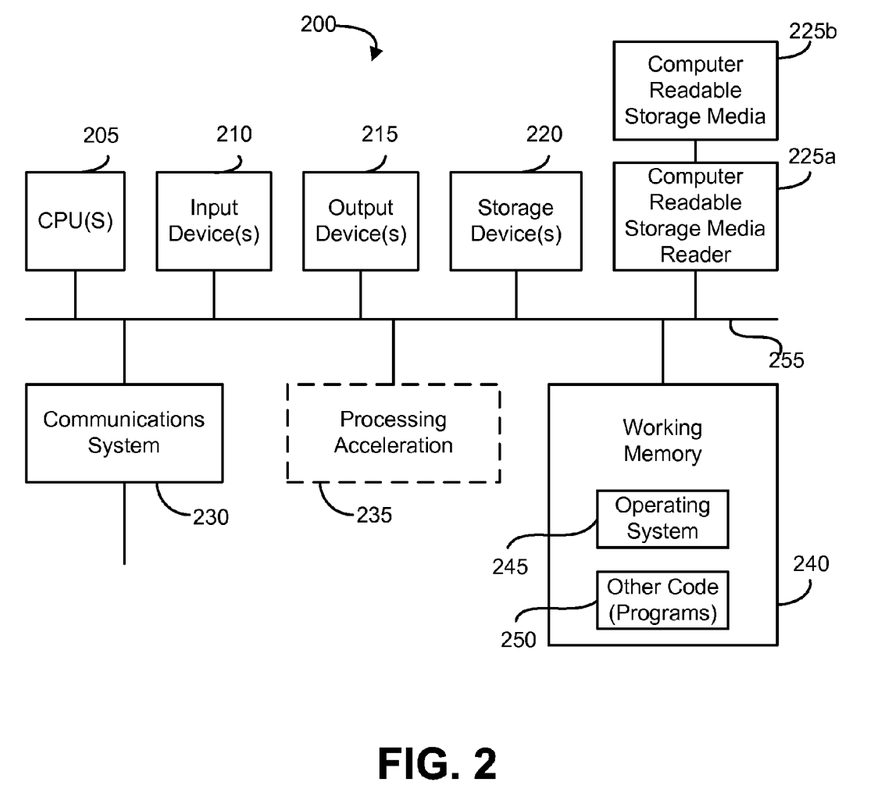
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
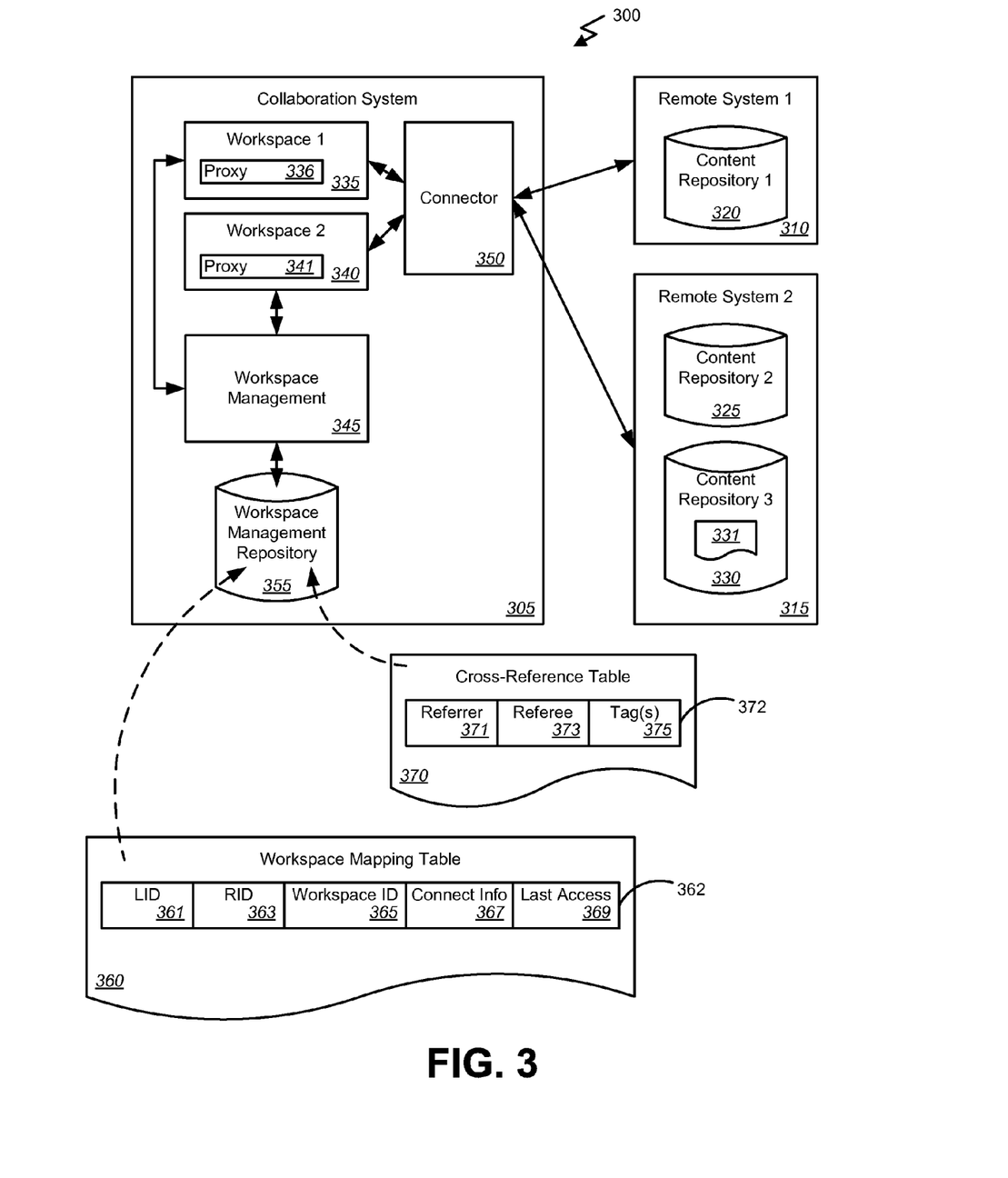
FIG. 3 is a block diagram illustrating, at a high-level, functional components of a system for providing enterprise collaboration with reusable content according to one embodiment of the present invention.

FIG. 3 is a block diagram illustrating, at a high-level, functional components of a system for providing enterprise collaboration with reusable content according to one embodiment of the present invention. In this example, the system includes a collaboration system 305 such as a computer system described above executing an application for providing a collaboration environment. One example of an application providing a collaboration environment in which embodiments of the present invention may be implemented is Oracle Beehive Collaboration Server. Other similar environment may also be suitable for implementing embodiments of the present invention.

As noted above, the collaboration system 305 can provide a workspace centric, homogenous, team personalized access to content with support for extensible functionality. As used herein, workspace centric means that one or more workspaces 335 and 340 of the collaboration environment executed by collaboration system 305 can access and utilize any content, whether internal or external to the workspace 335 or 340 and/or collaboration system 305. Internal content can be considered any content that is physically present in the collaboration environment, e.g., in a database or file system or collaboration system 305. Conversely, external content can be any content that is not internal. As used herein, homogenous means the workspaces 335 and 340 can access to any content form, e.g., document, email, presentations, scanned documents, etc., from the workspace. That is, users do not need to have separate tools/applications to access different types of content, whether internal or external Team personalized means that team workspace members see as if the content belongs only to them with the exception of the content itself. Also, as used herein, extensible functionality refers to the ability of team workspace members to apply all the functionality of the workspaces such as applying tags, comments, metadata, access control, etc. on the content irrespective of the content being external or internal.

As noted above, the collaboration environment executed by collaboration system 305 can access and utilize any content, whether internal or external to the workspace 335 or 340 and/or collaboration system 305. For example, content connector 350 can be used to connect to and access content from one or more content repositories 320-330. It should be noted that the content repositories 320-330 need not be a file server or database based content system. Rather, they can be a business application such as a CRM/ERP/SCM system. As illustrated here, the repositories 320-330 can be maintained by one or more remote system 310 and 315 accessible by the collaboration system 305 through the connector 350. The collaboration system 305 and remote systems 310 and 315 may be communicatively coupled via a network such as the Internet or any other local area or wide area network as described above. Generally speaking, the connector 350 provides interfaces to the repositories 320-330 and remote systems 310 and 315 and is capable of transforming and presenting content.

The collaboration environment executed by collaboration system 305 can also include a workspace management module 345 for managing and/or maintaining workspaces 335 and 340 and providing access to the content items represented therein, for example through a graphical or other user interface (not shown here). Generally speaking, each workspace 335 and 340 can provide each content item represented therein with a unique identifier (UID). Content items may be basic content items such as documents, email messages, spreadsheets, etc., or content containers such as folders, folios, etc. As noted, the content item may be external or internal. Additionally, each workspace 335 and 340 can provide meta-data management such as tagging, cross referencing/creating shortcuts and access control to content items represented therein.

So for example, users in a given workspace can, using tools provided by workspace management module 345, create content items that refer to a content, such as a supplied info or a folder in a content repository 320-330. Users in a given workspace 335 or 340 can apply meta-data and/or create cross-references between the content items represented therein. Thus it is possible to create meta-data references between internal and external item or two or more external items. It is also possible to create shortcuts to content items, including external content item. As noted, workspace management module 345 also provides for applying a tag or tags to a content item in each workspace 335 or 340 in a team personalized (i.e., not seen by other workspaces), homogeneous (i.e., from the perspective of the user, applying a tag to a content item in the workspace is the same applying tag on the external information) manner.

Thus, embodiments of the present invention provide for assigning a unique identifier to a content item, e.g., remote content item 331, in a context, i.e., a current workspace 335 and/or 340, from which the content item 331 is accessed. Based on the context/workspace 335 or 340 from which the content item 331 is accessed, a proxy 336 and/or 341 of that content item 331 can be provided. The proxy 336 or 341 of a content item 331 for a given context/workspace 335 or 340 can be independent of other contexts/workspaces that access the same content item 331. Therefore, changes to a proxy within a workspace, e.g., tags applied to proxy 336 or definition of or changes to relationships between proxies of content item 331 within workspace 335, do not effect the original content item 331 or proxy 341 of that content item 331 in workspace 340.

Stated another way, embodiments of the present invention provide a collaboration environment in which a number of different workspaces 335 and 340 can use the same, reusable content item 331. According to one embodiment, providing for collaboration using reusable content can comprise identifying a content item 331 to be included in a first workspace 335 of a plurality of workspaces 335 an 340 of a collaboration environment executed by collaboration system 305. A first proxy 336 representing the identified content item 331 can be created. The first proxy 336 can have a unique identifier within the first workspace 335.

To maintain a link between the proxy 336 and/or 341 and the original content item 331 and/or other proxies or content items in the workspaces 335 and 340, the workspace management module 345 can create and maintain a set of tables including a workspace mapping table 360 and a cross-reference table 370 which can be maintained, for example, in a workspace management repository 355. A mapping table record 362 can be created in the mapping table 360 for the first proxy 336 that links the first proxy 336 to the content item 331. Additionally, a cross-reference table record 372 can be created in the cross-reference table 370 for the first proxy 336. The cross-reference record 372 can identify a relationship of the first proxy 336 to another content item (not shown here) in the first workspace 335. Similarly, a second proxy 341 representing the identified content item 331 can also be created in a second workspace 340 of the plurality of workspaces. The second proxy 341 can have a unique identifier within the second workspace 340. A mapping table record can also be created for the second proxy 341 that links the second proxy to the content item 331.

According to one embodiment, the record 362 of the mapping table 360 can comprise a local identifier field 361 storing the unique identifier for the first proxy 336. A location identifier field 363 of the mapping table record 362 can store an identifier for locating the content item. For example, the location identifier field 363 can comprise a URL or other remote identifier that is used to locate the content item in an external system. The record 362 of the mapping table 360 can also include a workspace identifier field 365 storing a unique identifier for the first workspace in the plurality of workspaces. The workspace identifier can be the identifier of the workspace, within a plurality of workspaces in the system. A connect information field 367 of the mapping table record 362 can store information for accessing the content item. This information can be, for example, a pointer to information that is used by the connector 350 to connect to and access data from the remote system. For example, such information may comprise a user identifier, password, certificate or other credential, etc. The record 362 of the mapping table 360 can also include a last access field 362 indicating the latest time at which the content item was accessed by any user in a given workspace. According to one embodiment, for a internal content item, other than the local identifier field 361 and workspace identifier field 365, the fields can be assigned a NULL value.

The record 372 of the cross reference table 370 can comprise a referrer field 371 storing the local identifier for the first proxy. A referee field 373 of the cross reference table record 372 can store a local identifier for a proxy of a content item to which the first proxy relates. One or more tags including metadata describing the content item to which the first proxy relates can also be stored in a tags field 375 of the cross reference table record 372.

When a user accesses the workspace, a selection of a content item 331 to be accessed in the first workspace 335 can be received. The mapping table 360 can be searched for a record 362 of a proxy 336 for the selected content item 331. A determination can be made based on searching the mapping table 360 as to whether the selected content item 331 is a new content item in the first workspace 335. That is, if there is no record of a proxy existing in the workspace, i.e., no record in the mapping table 360, the content item can be considered new to the workspace. In response to determining the selected content item 331 is a new content item in the first workspace 335, a proxy 336 can be created representing the new content item 331 and a mapping table record 362 can be created for the proxy 336. In response to determining the selected content item 331 is not a new content item, i.e., the mapping table record 362 for the proxy 336 already exists, the selected content item 331 can be accessed through a proxy 336 for the selected content item 331 based on the information of the mapping table record 362. Based on the user's access of the content item 331, i.e., operations performed within the workspace, a determination can be made as to whether to update the selected content item 331 in the first workspace 335, i.e., update the proxy 336 and related mapping table record 362 and/or cross-reference table record 372. In response to determining to update the selected content item 331 in the first workspace 335, a record 372 in the cross reference table 370 for the proxy 336 of the selected content item 331 can be updated.

Figure 4:
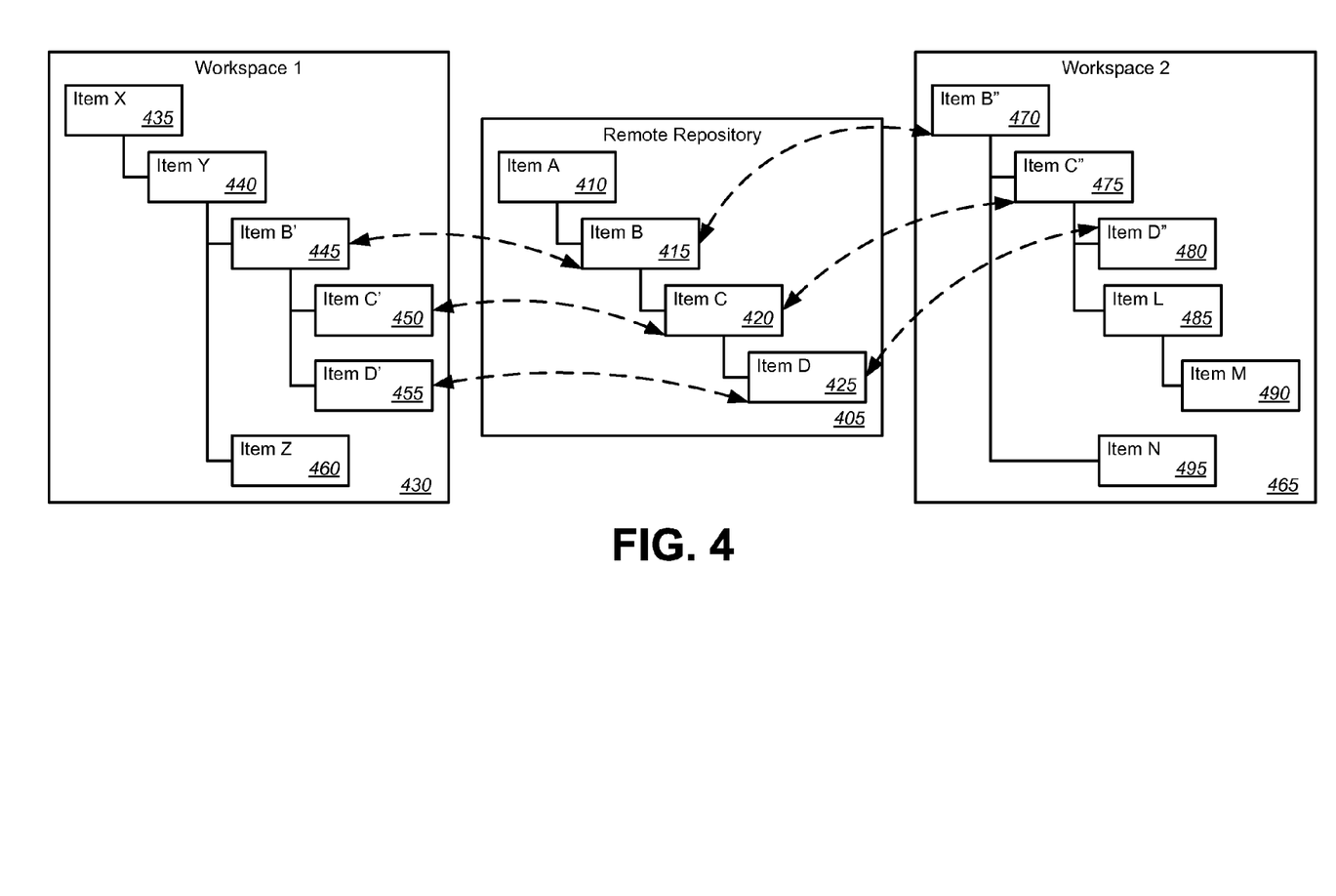
FIG. 4 is a block diagram illustrating a logical arrangement of multiple collaboration workspaces utilizing reusable content according to one embodiment of the present invention.

FIG. 4 is a block diagram illustrating a logical arrangement of multiple collaboration workspaces utilizing reusable content according to one embodiment of the present invention. This example illustrates two workspaces 430 and 465 and a remote repository 405. The remote repository includes a number of content items 410-425 as described above. For example, the content items 410-425 can include a number of folders and subfolders 410, 415, and 420 and other items 425 such as documents, emails, calendar appointments, task assignments, etc. The workspaces can include local content items and proxies representing the remote content items 410-425 of the remote repository 405. For example, workspace 1 430 can include local content items 435, 440, and 460 and proxies 445, 450, and 455 for remote content items 415, 420, and 425 respectively of the remote repository 405. Similarly, workspace 2 465 can include local content items 485, 490, and 495 and proxies 470, 480, and 475 for remote content items 415, 420, and 425 respectively of the remote repository 405.

As described above, based on the mapping table records and cross-reference table records for the proxies and local content items of the individual workspaces 430 and 465, different relationships can be defined. So for example, workspace 1 430 can represent a relationship between the proxies 445, 450, and 455 remote content items 415, 420, and 425 as represented in workspace 1 430 that is different from the relationship between the proxies 470, 480, and 475 for the same remote content items 415, 420, and 425 as represented in workspace 2 465. Furthermore, the proxies of the individual workspaces can have different tags assigned thereto. The tags and defined relationships between the proxies 445, 450, 455, 470, 475, and 480 of the individual workspaces 430 and 465 allow access to and manipulation of the proxies 445, 450, 455, 470, 475, and 480 within the workspaces 430 and 465 without affecting the other workspaces or the original content items 415, 420, and 425 and without replicating the original content items 415, 420, and 425 within the individual workspaces 430 and 465.

Figure 5:
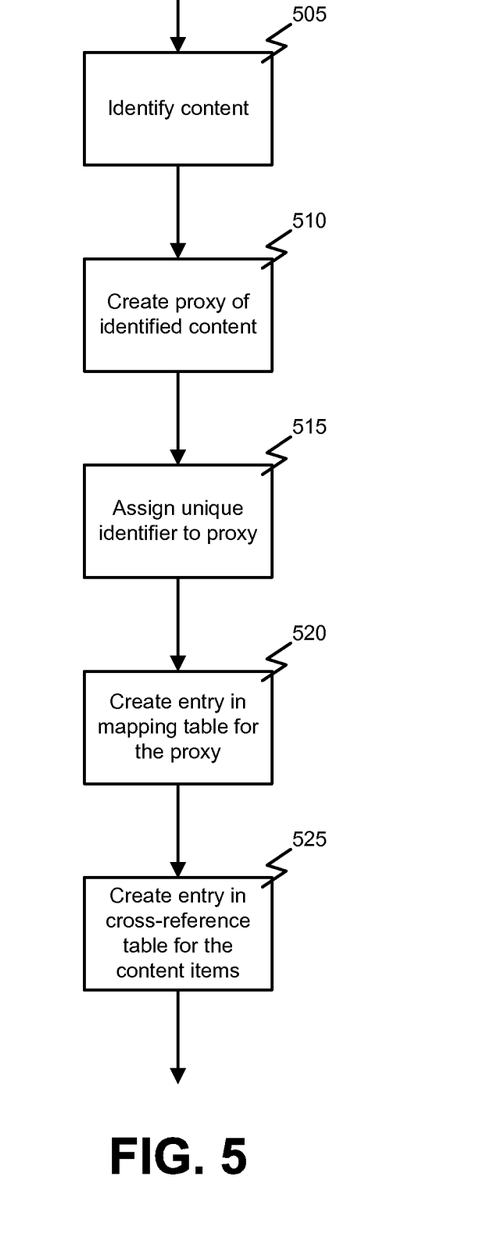
FIG. 5 is a flowchart illustrating a process for incorporating reusable content in a collaboration workspace according to one embodiment of the present invention.

FIG. 5 is a flowchart illustrating a process for incorporating reusable content in a collaboration workspace according to one embodiment of the present invention. In this example, the process begins with identifying 505 a content item to be included in a first workspace of a plurality of workspaces of a collaboration environment. A first proxy representing the identified content item can be created 510. A unique identifier can be assigned 515 to the first proxy that uniquely identifies the first proxy within the first workspace. A mapping table record can be created 520 for the first proxy that links the first proxy to the content item. The record of the mapping table can comprise a local identifier field storing the unique identifier for the first proxy. A location identifier field of the mapping table record can store an identifier for locating the content item. The record of the mapping table can also include a workspace identifier field storing a unique identifier for the first workspace in the plurality of workspaces. A connect information field of the mapping table record can store information for accessing the content item.

Additionally, a cross-reference table record can be created 525 for the first proxy. The cross-reference record can identify a relationship of the first proxy to another content item in the first workspace. The record of the cross reference table can comprise a referrer field storing the local identifier for the first proxy. A referee field of the cross reference table can store a local identifier for a proxy of a content item to which the first proxy relates. One or more tags including metadata describing the content item to which the first proxy relates can also be stored in a field of the cross reference table.

Figure 6:
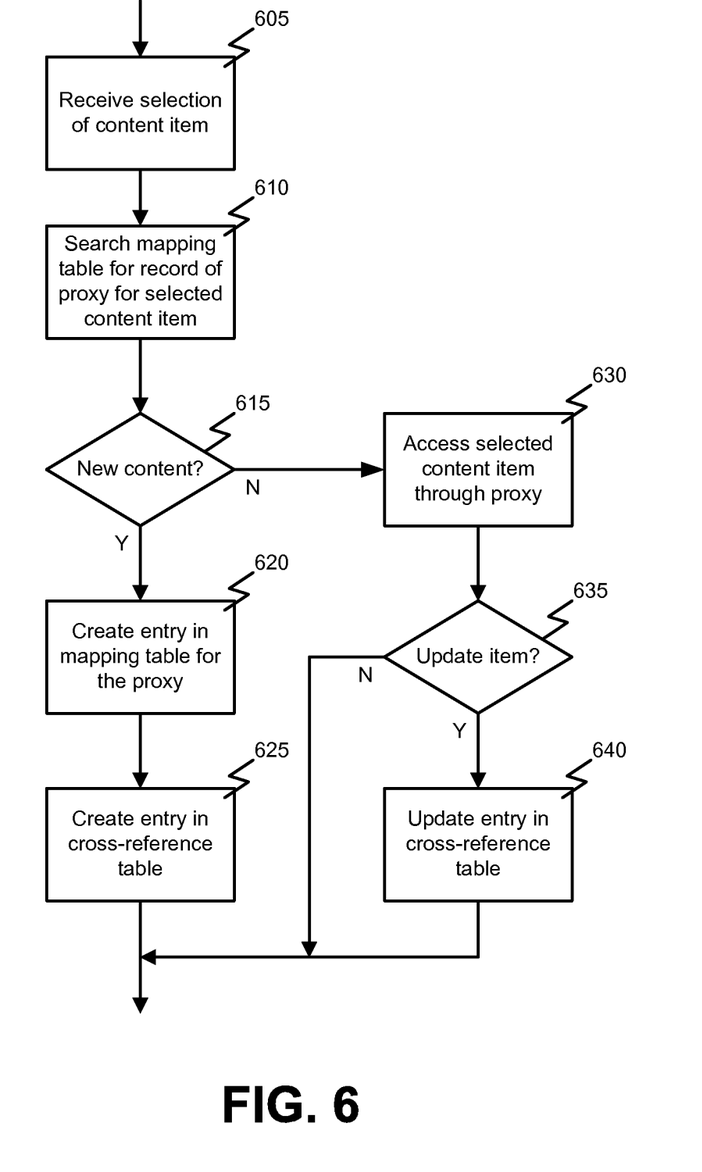
FIG. 6 is a flowchart illustrating a process for accessing reusable content in a collaboration workspace according to one embodiment of the present invention.

FIG. 6 is a flowchart illustrating a process for accessing reusable content in a collaboration workspace according to one embodiment of the present invention. When a user accesses the workspace, the process begins with receiving 605 a selection of a content item to be accessed in the first workspace can be received. The mapping table can be searched 610 for a record of a proxy for the selected content item. A determination 615 can be made based on searching 610 the mapping table as to whether the selected content item is a new content item in the first workspace. In response to determining 615 the selected content item is a new content item in the first workspace, a proxy can be created 620 representing the new content item and a mapping table record can be created 625 for the proxy. In response to determining 615 the selected content item is not a new content item, the selected content item can be accessed 630 through a proxy for the selected content item. Based on the user's access of the content item, i.e., operations performed, a determination 635 can be made as to whether to update the selected content item in the first workspace. In response to determining 635 to update the selected content item in the first workspace, a record in the cross reference table for the proxy of the selected content item can be updated 640.

According to one embodiment, entries in the mapping table can be periodically garbage collected. This can be accomplished in a number of different ways for maintaining and purging data stored in tables. For example, this garbage collection of the mapping table can be done by deleting the proxy entries that do not have any references. References include meta-data, tags, links that are attached to this entry/content item proxy. Furthermore, the last accessed column in the table can be used to purge entries that are not accessed for a period of time (which may be configurable). Additionally or alternatively, the system can listen for events from an external repository that owns the content item such as when the original content item is deleted or modified. The events can be propagated to applications that are currently using the proxy object, such as a web browser that is displaying the proxy. For example, if the original content item is deleted, the event can notify any clients (say a web browser) that would have "cached" the proxy object to clear the proxy entry from its cache. When the entries for the proxies are selected for garbage collection, the system can notify the clients that would have "cached" the proxy object to refresh the proxy. If any client (say a web browser) refresh the proxy within a small time window, the last accessed column can be updated to keep the proxy entry in the table to avoid garbage collection. When the proxy entry is finally cleared by garbage collection, the system can notify the clients to clear the proxy entry from their caches.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing collaboration using reusable content, the method comprising:
    identifying a content item to be included in a first workspace of a plurality of workspaces of a collaboration environment;
    creating a first proxy representing the identified content item, the first proxy having a unique identifier within the first workspace, wherein the first proxy comprises a view of the first content item specific to the first workspace but without requiring the first content item to be replicated within the first workspace; and
    creating a mapping table record for the first proxy, the mapping table record linking the first proxy to the content item;
    creating a cross-reference table record for the first proxy, the cross-reference record identifying a relationship of the first proxy to another content item in the first workspace;
    receiving a selection of a content item to be accessed in the first workspace;
    searching the mapping table for a record of a proxy for the selected content item;
    determining based on searching the mapping table whether the selected content item is a new content item in the first workspace;
    in response to determining the selected content item is a new content item in the first workspace;
    creating a new proxy representing the identified content item, the new proxy having a unique identifier within the first workspace, wherein the new proxy comprises a view of the new content item specific to the first workspace but without requiring the new content item to be replicated within the first workspace;
    in response to determining the selected content item is not a new content item;
    accessing the selected content item through a proxy for the selected content item;
    determining whether to update the selected content item in the first workspace; and
    in response to determining to update the selected content item in the first workspace, updating the proxy, mapping table and the cross reference table of the selected content item; said proxy comprises a view of the first content item specific to the first workspace but without requiring the first content item to be replicated within the first workspace.

2. The method of claim 1, wherein the record of the mapping table comprises a local identifier field storing the unique identifier for the first proxy, a location identifier field storing an identifier for locating the content item, a workspace identifier field storing a unique identifier for the first workspace in the plurality of workspaces, and a connect information field storing information for accessing the content item.

3. The method of claim 2, wherein the record of the cross reference table comprises a referrer field storing the local identifier for the first proxy, a referee field storing a local identifier for a proxy of a content item to which the first proxy relates, and one or more tags including metadata describing the content item to which the first proxy relates.

4. The method of claim 1, further comprising:
    creating a second proxy representing the identified content item in a second workspace of the plurality of workspaces, the second proxy having a unique identifier within the second workspace; and
    creating a mapping table record for the second proxy, the mapping table record linking the second proxy to the content item.

5. A system comprising:
    a processor; and
    a memory communicatively coupled with and readable by the processor and having stored therein a series of instructions which, when executed by the processor, cause the processor to execute a collaboration environment providing collaboration using reusable content by identifying a content item to be included in a first workspace of a plurality of workspaces of a collaboration environment, creating a first proxy representing the identified content item, the first proxy having a unique identifier within the first workspace, wherein the first proxy comprises a view of the first content item specific to the first workspace but without requiring the first content item to be replicated within the first workspace, and creating a mapping table record for the first proxy, the mapping table record linking the first proxy to the content item,
    creating a cross-reference table record for the first proxy, the cross-reference record identifying a relationship of the first proxy to another content item in the first workspace;
    receiving a selection of a content item to be accessed in the first workspace;
    searching the mapping table for a record of a proxy for the selected content item;
    determining based on searching the mapping table whether the selected content item is a new content item in the first workspace;
    in response to determining the selected content item is a new content item in the first workspace;
    creating a new proxy representing the identified content item, the new proxy having a unique identifier within the first workspace, wherein the new proxy comprises a view of the new content item specific to the first workspace but without requiring the new content item to be replicated within the first workspace;
    in response to determining the selected content item is not a new content item:
    accessing the selected content item through a proxy for the selected content item;
    determining whether to update the selected content item in the first workspace; and
    in response to determining to update the selected content item in the first workspace, updating the proxy, mapping table and the cross reference table of the selected content item; said proxy comprises a view of the first content item specific to the first workspace but without requiring the first content item to be replicated within the first workspace.

6. The system of claim 5, wherein the record of the mapping table comprises a local identifier field storing the unique identifier for the first proxy, a location identifier field storing an identifier for locating the content item, a workspace identifier field storing a unique identifier for the first workspace in the plurality of workspaces, and a connect information field storing information for accessing the content item.

7. The system of claim 6, wherein the record of the cross reference table comprises a referrer field storing the local identifier for the first proxy, a referee field storing a local identifier for a proxy of a content item to which the first proxy relates, and one or more tags including metadata describing the content item to which the first proxy relates.

8. The system of claim 5, wherein the instructions further cause the processor to:
    create a second proxy representing the identified content item in a second workspace of the plurality of workspaces, the second proxy having a unique identifier within the second workspace; and
    create a mapping table record for the second proxy, the mapping table record linking the second proxy to the content item.

9. The system of claim 8, wherein the content item is remote from the system.

10. A machine-readable medium having stored thereon a series of instructions which, when executed by a processor, cause the processor to provide collaboration using reusable content by:
    identifying a content item to be included in a first workspace of a plurality of workspaces of a collaboration environment;
    creating a first proxy representing the identified content item, the first proxy having a unique identifier within the first workspace, wherein the first proxy comprises a view of the first content item specific to the first workspace but without requiring the first content item to be replicated within the first workspace; and
    creating a mapping table record for the first proxy, the mapping table record linking the first proxy to the content item;
    creating a cross-reference table record for the first proxy, the cross-reference record identifying a relationship of the first proxy to another content item in the first workspace;
    receiving a selection of a content item to be accessed in the first workspace;
    searching the mapping table for a record of a proxy for the selected content item;
    determining based on searching the mapping table whether the selected content item is a new content item in the first workspace;
    in response to determining the selected content item is a new content item in the first workspace;
    creating a new proxy representing the identified content item, the new proxy having a unique identifier within the first workspace, wherein the new proxy comprises a view of the new content item specific to the first workspace but without requiring the new content item to be replicated within the first workspace;
    in response to determining the selected content item is not a new content item;
    accessing the selected content item through a proxy for the selected content item;
    determining whether to update the selected content item in the first workspace; and
    in response to determining to update the selected content item in the first workspace, updating the proxy, mapping table and the cross reference table of the selected content item; said proxy comprises a view of the first content item specific to the first workspace but without requiring the first content item to be replicated within the first workspace.

11. The machine-readable medium of claim 10, further comprising:
    creating a second proxy representing the identified content item in a second workspace of the plurality of workspaces, the second proxy having a unique identifier within the second workspace; and
    creating a mapping table record for the second proxy, the mapping table record linking the second proxy to the content item.

* * * * *

UNITED STATES PATENT AND TRADEMARK OFFICE
CERTIFICATE OF CORRECTION

PATENT NO. : 8,478,717 B2
APPLICATION NO. : 12/843157
DATED : July 2, 2013
INVENTOR(S) : Vedula et al.

It is certified that error appears in the above-identified patent and that said Letters Patent is hereby corrected as shown below:

In the Claims

In column 13, line 41, in Claim 1, delete "workspace;" and insert -- workspace: --, therefor.

In column 13, line 51, in Claim 1, delete "item;" and insert -- item: --, therefor.

In column 14, line 48, in Claim 5, delete "workspace;" and insert -- workspace: --, therefor.

In column 16, line 13, in Claim 10, delete "workspace;" and insert -- workspace: --, therefor.

In column 16, line 20, in Claim 10, delete "item;" and insert -- item: --, therefor.

Signed and Sealed this
Twenty-second Day of October, 2013

Teresa Stanek Rea
*Deputy Director of the United States Patent and Trademark Office*